United States Patent
O'Neil

(10) Patent No.: US 7,970,017 B2
(45) Date of Patent: Jun. 28, 2011

(54) PEER-TO-PEER SYNCHRONIZATION OF DATA BETWEEN DEVICES

(75) Inventor: Douglas O'Neil, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 874 days.

(21) Appl. No.: 11/180,842

(22) Filed: Jul. 13, 2005

(65) Prior Publication Data

US 2007/0014314 A1    Jan. 18, 2007

(51) Int. Cl.
*H04J 3/06* (2006.01)
*G06F 15/16* (2006.01)

(52) U.S. Cl. .......................... 370/503; 709/248
(58) Field of Classification Search .................. 370/503, 370/507, 508, 509; 709/248
See application file for complete search history.

(56) References Cited

U.S. PATENT DOCUMENTS

| | | | |
|---|---|---|---|
| 7,346,705 B2 * | 3/2008 | Hullot et al. ................. | 709/238 |
| 7,426,539 B2 * | 9/2008 | Datta ............................ | 709/205 |
| 7,500,020 B1 * | 3/2009 | Kabra et al. .................. | 709/248 |
| 7,680,885 B2 * | 3/2010 | Schauser et al. ............. | 709/205 |
| 2002/0056011 A1 * | 5/2002 | Nardone et al. ............. | 709/248 |
| 2003/0081553 A1 * | 5/2003 | Bitar ............................ | 370/236 |
| 2004/0153473 A1 * | 8/2004 | Hutchinson et al. ........ | 707/104.1 |
| 2004/0172423 A1 * | 9/2004 | Kaasten et al. .............. | 707/201 |
| 2005/0117593 A1 * | 6/2005 | Shand .......................... | 370/401 |
| 2005/0135429 A1 * | 6/2005 | Bingham et al. ............ | 370/503 |
| 2005/0232168 A1 * | 10/2005 | Schauser et al. ............ | 370/261 |
| 2006/0018270 A1 * | 1/2006 | Forand et al. ................ | 370/324 |
| 2006/0069809 A1 * | 3/2006 | Serlet ........................... | 709/248 |
| 2006/0242206 A1 * | 10/2006 | Brezak et al. ................ | 707/201 |
| 2007/0019682 A1 * | 1/2007 | Krzyzanowski ............. | 370/503 |
| 2008/0320172 A1 * | 12/2008 | Kruglikov et al. ........... | 709/248 |

* cited by examiner

*Primary Examiner* — Warner Wong

(57) ABSTRACT

An automatic synchronization method and apparatus that synchronizes data on a peer-to-peer basis across multiple devices. Automatic synchronization occurs on one or more similar user devices from one device to another and does not require synchronization with a central server. No single device acts as a central synchronization server, but all devices on which the application resides and that have the data to be synchronized can communicate with each other directly, or indirectly through other devices that have direct communication with the device on which data is changed.

9 Claims, 5 Drawing Sheets

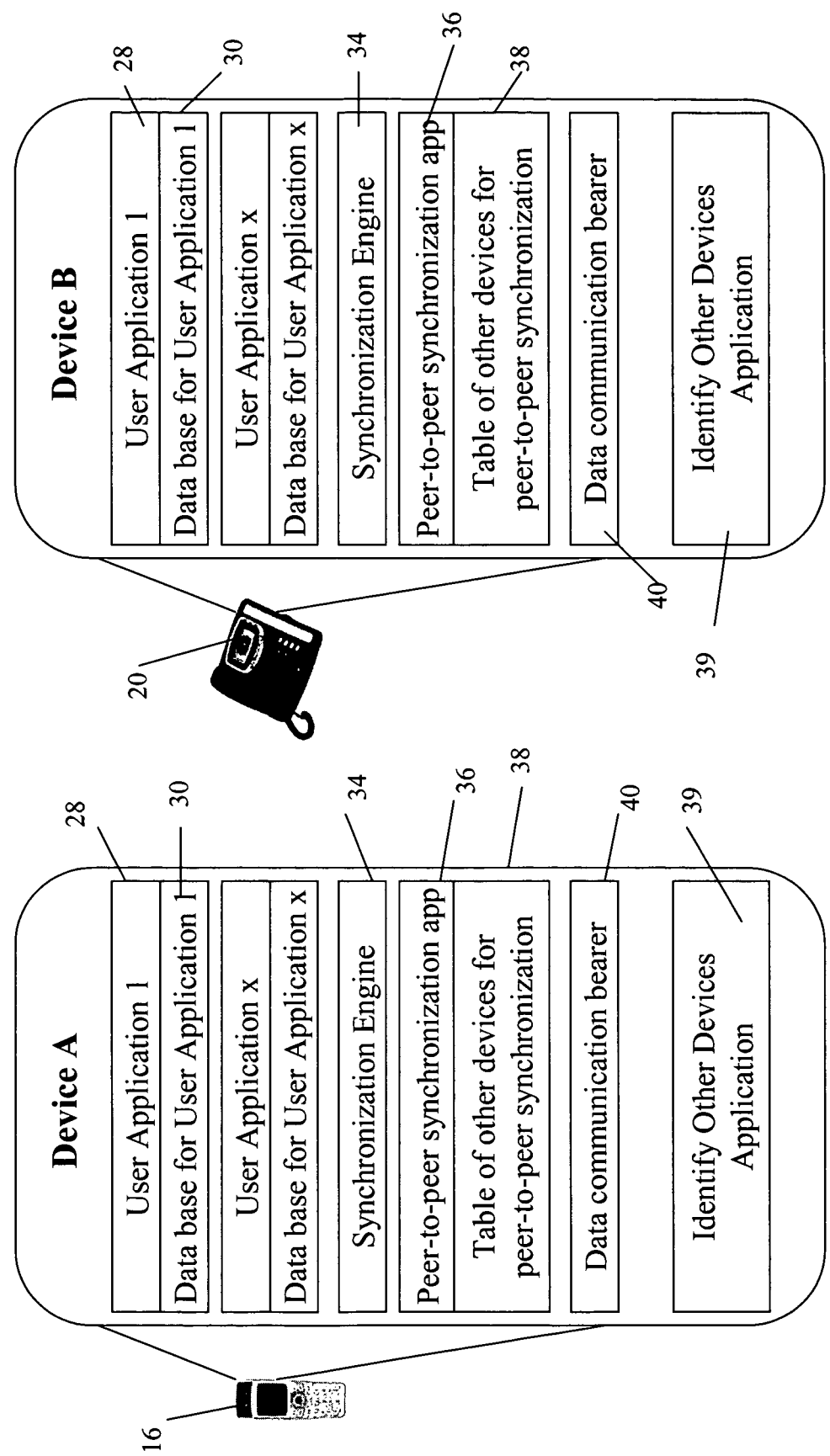

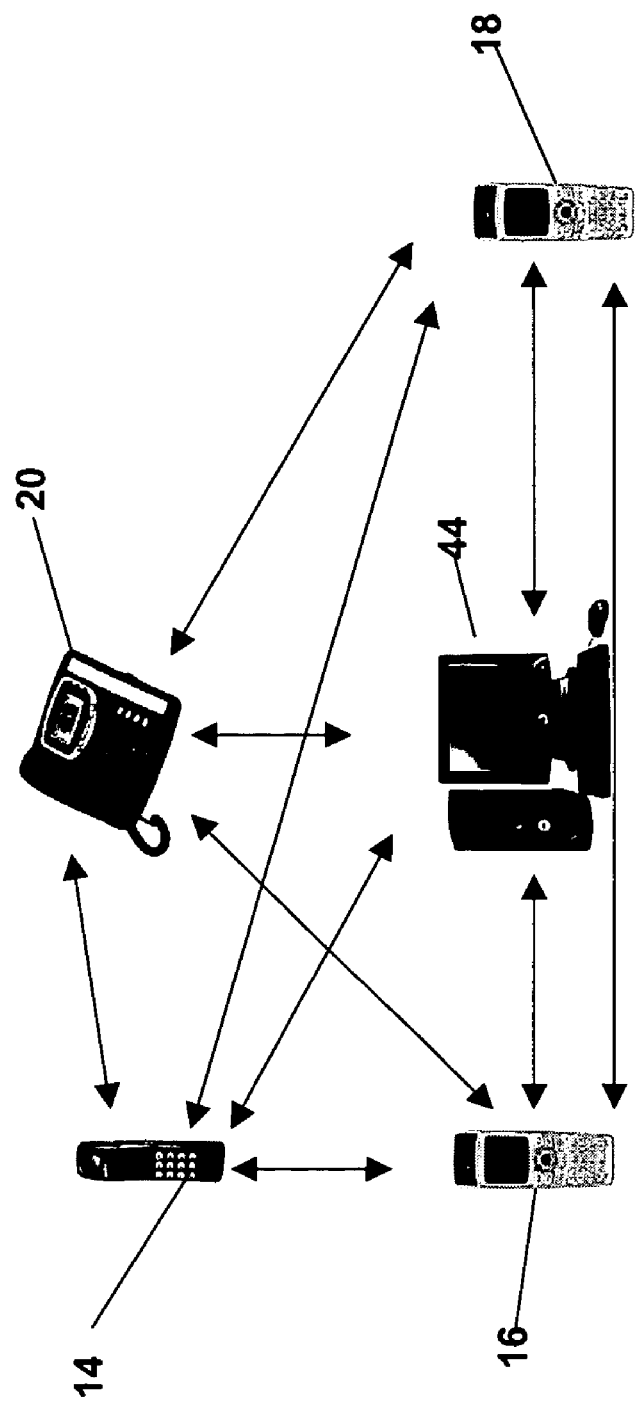

PEER-TO-PEER SYNCHRONIZATION OF DATA BETWEEN DEVICES

FIELD OF INVENTION

This invention relates in general to apparatus and methods for exchange of data between multiple devices, and relates in particular to the automatic synchronization of data across multiple devices that are peers of each other within a network.

BACKGROUND OF THE INVENTION

Users of communications or data devices increasingly need to access common data on many of the devices they use. For example, many devices such as corded and cordless telephones, cellular handsets, WiFi telephones and handsets, and similar devices have the ability to store user-changeable data such as telephone numbers and associated names of frequently-called parties. More advanced telephones and handsets may permit downloading and storing one or more ring tones and the ring-tone settings for incoming calls based on caller line ID service. Still other examples of devices intended for storing user-changeable data are so-called Personal Information Managers (PIM) that store data such as an address book, an appointment calendar, and email functions associated with IP addresses stored in the device.

Increasingly, people may own or use several such devices and have the need to maintain and update current information on all such devices. For example, a person may have a cellular handset, a corded phone, and at least one cordless phone at home and a PIM relating to the person's work or occupation. The names, telephone numbers, appointments, and other data stored in the devices change routinely, requiring the user not only to update that data on each device but also to remember to do so. Furthermore, if the user acquires a new device such as an additional cordless handset or a new cellular handset, the user must enter anew all the directory information on that new device.

Techniques for synchronizing data on devices are known. However, those techniques involve synchronization between a device and a server. The techniques are most commonly applied to synchronization of address book, calendar, and email. In those approaches, for example, when a user changes a data field in a calendar entry on a device, and then docks or otherwise connects that device to a server equipped for the purpose, the calendar application on the device is synchronized with the calendar application of the server. This prior technique is best suited for enterprise applications, and other situations where the user can afford a central server to centralize data synchronization across multiple devices. However, home users and others lacking access to a central server must separately update their data on each device in use by them.

SUMMARY OF THE INVENTION

Stated in general terms, the present invention comprises methods and apparatus for automatic synchronization of data across selected plural devices on a peer-to-peer basis. This automatic synchronization according to the present invention preferably is triggered when there is a change in data on any one or more of the devices. With the technique of the present invention, data associated with a user application that is resident on a particular device is automatically synchronized with the data for the same application on other devices on which that application resides. The devices that are automatically synchronized can communicate with each other over a local area network, and can also communicate with each other across a wide area of network such as a cellular data network, the Internet, or other local or wide-area data networks using an appropriate communication protocol. Because automatic synchronization according to the present invention occurs in peer-to-peer communication across multiple devices, no single device is required to act as a central synchronization server. Instead, all devices on which the user application or applications reside, and that have data to be synchronized, are able to communicate with each other directly or indirectly as further disclosed herein. As a result, the user need only update particular data on one device equipped according to the present invention, and that data is automatically synchronized across all other such devices chosen by the user. If the user acquires a new device, such as a cellular handset or a cordless handset so equipped, corresponding user applications on that new device will be populated with the existing information from at least one present device of the user, on a peer-to-peer basis, when an appropriate communication link is established between the new device and at least one existing device.

BRIEF DESCRIPTION OF THE DRAWINGS

FIG. 2 is a schematic view illustrating elements of two devices equipped for peer-to-peer synchronization of features according to the embodiment shown in FIG. 1.

FIG. 4 is a flowchart illustrating certain steps in peer-to-peer synchronization of data according to the disclosed embodiments of the present invention.

DETAILED DESCRIPTION OF DISCLOSED EMBODIMENT

Figure 1:
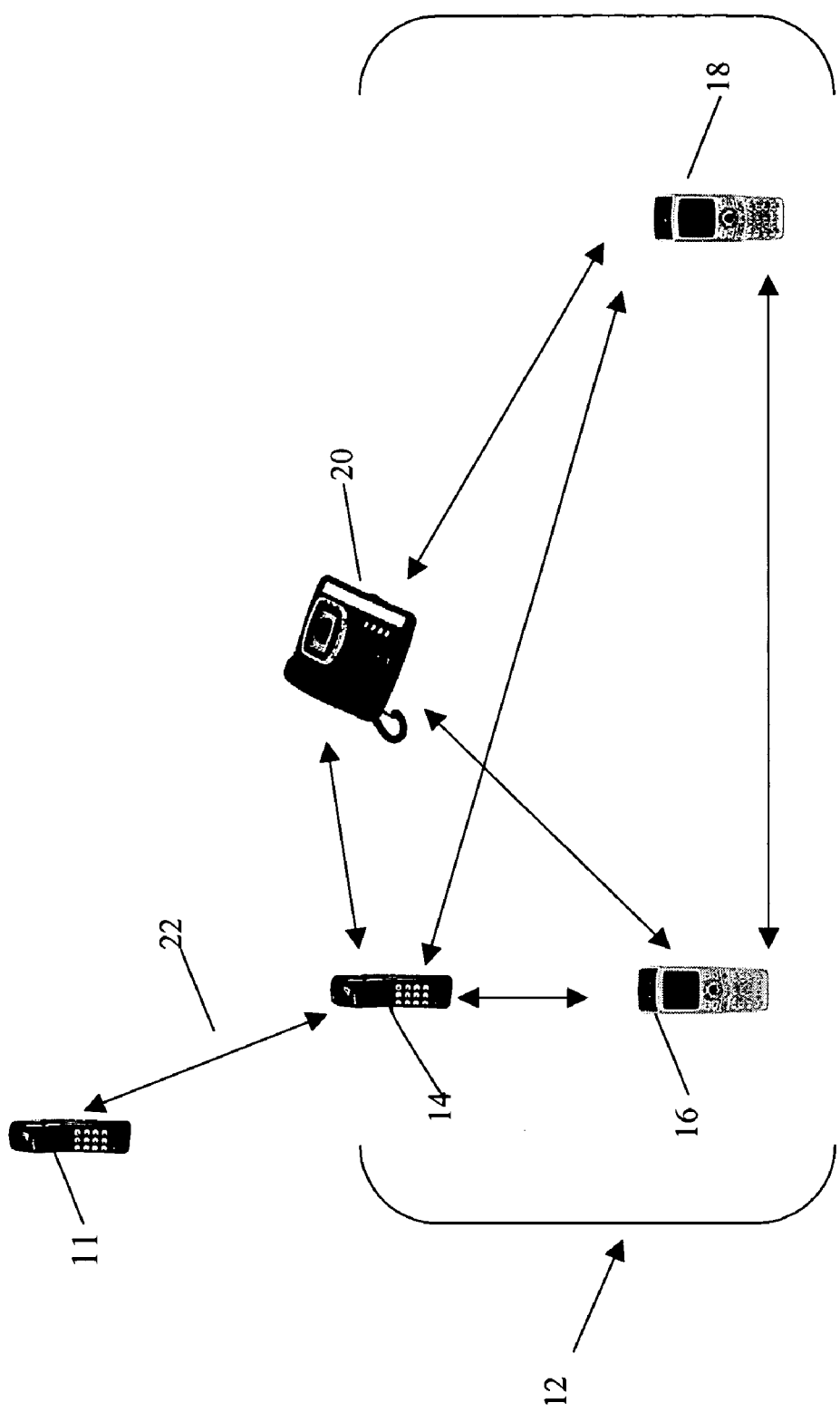
FIG. 1 is a schematic view showing for peer-to-peer synchronization of features according to an exemplary embodiment of the invention.

FIG. 1 shows in schematic form a plurality of devices that support at least one user application for synchronization of data across multiple devices. The term "user application" refers to a database associated with each device, for receiving and storing data on that device. Examples of data or information stored on typical user applications include address books that may contain names and telephone numbers, ring tones downloaded into the device, ring-tone settings for incoming calls based on caller line ID supported by the device, and calendar schedule information. Other user applications may include a photo library, a music library, a video clip library, and any other kind of data capable of storage and retrieval in electronic form.

Device 11 in FIG. 1 is depicted as a cordless handset having at least one user application and containing user-changed data. However, it should be understood that the depiction and description of device 11 and all the devices collectively indicated at 12 in FIG. 1, is by way of example only and should not be considered as a complete list of devices appropriate for peer-to-peer synchronization of data according to the present invention. For example, the device 11 could alternatively represent a PIM such as a Palm™ or a Treo™ device known to those skilled in the art. By way of further example, the device 11 could be a wireless message communication device such as a Blackberry™ device, containing one or more user applications and also incorporating message communications and a cellular handset for voice communication.

The other devices 12 shown in the peer-to-peer example of FIG. 1 include a cordless phone 14, a dual-mode cordless and cellular handset 16, a wide area cellular handset 18, and a wired phone 20. Those skilled in the art will recognize each of those kinds of phone devices. Thus, the cordless phone 14 may be a basic cordless phone communicating with a base station as known in the art, and as modified in accordance with the present invention as described below in greater detail. Alternatively, the cordless phone 14 may have a WiFi connection with a LAN, e.g., in a home or office environment or elsewhere. The dual mode handset 16 may, for example, incorporate VOIP capability for use within range of a suitable WiFi location, and cellular capability for communicating with available cell sites when traveling outside a VOIP-enabled WiFi zone. The wired phone 20 may incorporate a Session Initiation Protocol (SIP) for communication with the public switched telephone network as well as with the other devices 11 and 12 equipped for peer-to-peer synchronization of user-application features according to the present invention.

The bidirectional arrow 22 illustrates an example of peer-to-peer communication between the device 11 and the device 14 (one of the other devices collectively indicated at 12) following a change of information in at least one user application associated with the device 11. The other bidirectional arrows on FIG. 1 indicate the possible peer-to-peer communications between the device 14 and any or all of the other devices 12. These bidirectional arrows thus show that a user-initiated update of information on any one device, such device 11 in the illustrated example, is propagated to all other enabled devices 12 according to the present invention, even where initial peer-to-peer communication exists between the initially-changed device 11 and only one device 14 of the other devices 12. Accordingly, a change in data entered into a user application in the one device 11 is synchronized with one other device 14, and is then indirectly communicated from the device 14 to the other devices 16, 18, and 20 in peer-to-peer communication with that one device. In this manner, the information changed in the one device 11 is synchronized with all other devices 14, 16, 18 and 20 enabled according to the present invention. Likewise, data updated in a user application on any device 12 is propagated to the other devices peer-to-peer whenever a communication link, direct or indirect, is available between the devices.

FIG. 2 illustrates two devices enabled for peer-to-peer synchronization of data according to an embodiment of the present invention. Those two devices are represented by the cordless/cellular handset 16 and the wired phone 20 previously described, although it should be understood that the other devices 11, 14, and 18 each also have the capabilities depicted in FIG. 2. The devices 16 and 20 shown in FIG. 2 thus are exemplary of all devices according to the disclosed embodiment of the present invention, and for that reason the respective devices 16 and 20 shown in FIG. 2 are designated as the Device A and Device B.

Each of Devices A and B supports at least one user application 28 that has an associated database 30 for which there is a capability to automatically synchronize with one or more other devices. It should be evident that each device can host or support several user applications. Examples of user applications include a ring-tone application with ring-tones downloaded into the device. The database for a ring-tone application includes the one or more ring-tones that are downloaded into the device, and may also include the ring-tone settings for incoming calls based on caller line ID if the device is so enabled. With the automatic synchronization capability disclosed herein, a user can download a ring-tone to any device they own that also supports the ring-tone application, create a setting that defines the conditions under which that ring-tone will play (e.g., the caller ID of a particular party initiates a ring-tone assigned to that party) and synchronize the ring-tones and settings with all the other phone devices that the user owns or controls. In this way, the user can have several phones within their home and define a ring-tone on one phone, and then all of the phones in the home will ring with that ring-tone under the same incoming call conditions.

An address book application is another example of a user application 28. The database 30 for the address book application typically consists of contact information for different kinds of entries into the address book database. With the automatic synchronization capability disclosed herein, a user can create or change an address book entry on any device they own or control that also supports the address book application, and synchronize the address book entry with all the other such phones. The user thus can own several phones within their home and define or change an address book entry (e.g., name and telephone number) on one phone, and all the phones in the home are automatically updated and synchronized to have the same address book data. As a further example, an address book for home phones could also synchronize data with an address book on a similarly-equipped phone or other communication device (e.g., a PIM or a Blackberry communication device) related to the worker's office or work.

Calendar applications are another kind of user application 28 suited for peer-to-peer automatic synchronization according to the present invention. With that automatic synchronization capability, a user can create or change a calendar entry in Device A, for example, and then synchronize that calendar entry with a Device B and any other device they control that also supports the calendar application and peer-to-peer synchronization according to the present invention.

The foregoing and other specific user applications disclosed herein should be understood as only examples of kinds of data or information for which user applications and associated databases may be provided on devices equipped according to the present invention. Thus, each of Devices A and B also is shown in FIG. 2 as containing a user application X and an associated database X for that user application. It should also be understood that all such devices equipped according to the present invention need not have the exact same user applications. For example, if Device A supports a ring-tone application, an address book application, and a calendar application, but Device B supports only the address book and the calendar applications, then any user change to the databases associated with the address book and calendar applications common to both devices will be synchronized with each other. However, changes in the ring-tone database of Device A will not synchronize with Device B or any other device lacking that user application.

Devices A and B also each have a synchronization engine 34. The synchronization engine 34 within the devices according to the disclosed embodiment preferably is the SyncML data synchronization protocol known to those skilled in the art as a standard for universal synchronization of remote data and personal information across networks. That synchronization engine 34, or a similar synchronization engine and synchronization protocols, enables each device to exchange information about their respective capabilities, to request an exchange of information, and then proceed into a synchronization session if the capabilities of the devices peer-to-peer communication match up.

Each device A and B also contains a peer-to-peer automatic synchronization application 36, an embodiment of which is described below in greater detail. This application 36 allows a user to define user applications and devices that should be automatically synchronized and oversees the automatic synchronization process. Each device equipped according to the disclosed embodiment also includes a table 38 of other devices for peer-to-peer synchronization.

Each table 38 of other devices for synchronization, in the embodiment shown in FIG. 2, is a list or database of the other devices selected by the user and having at least one user application in common with the particular device containing the table. For example, the cordless handset 11 shown in FIG. 1 has a table of other devices 38 including the cordless phone 14, the cordless/cellular handset 16, the cellular handset 18, and the corded phone 20, each of which is assumed to have at least one user application that the user of the cordless handset 11 desires for peer-to-peer automatic synchronization with any changes the user makes to that user application in the cordless handset 11. Each device so equipped also includes software enabling the user of the device to identify the other devices for inclusion in or exclusion from the table 38 of other devices, preferably by way of a graphic user interface or other protocol allowing easy user access to the table 38.

Each device according to the disclosed embodiments also includes a data communication bearer 40 as illustrated for the Devices A and B. The data communication bearers 40 are the communication protocol over which peer-to-peer synchronization occurs between the devices listed on the table 38. That communication protocol can be on a local basis such as Bluetooth or 802.11, or on a wide-area basis such as GSM GPRS, GSM EDGE, GSM UMTS, CDMA 1XRTT, or CDMA EVDO. Those and other appropriate communication protocols are known to those skilled in the art.

Each device A and B includes an Identify Other Devices (IOD) application 39 to identify other devices for synchronization. The IOD application 39 determines the other devices that should be synchronized for a particular user application and populates the device identifiers for those other devices on the table 38 that lists the devices to be synchronized peer-to-peer for a given user application.

It should also be apparent that all devices listed on a table of other devices 38 for peer-to-peer synchronization need not be in range of each other for synchronization. Non-local devices may also be listed on the table 38 and accessed by way of any appropriate wide-area network such as the Internet, assuming the IP address or other wide-area protocol addresses of such remotely located other devices are included in the table of other devices 38.

The operation of a process flow for peer-to-peer automatic synchronization of devices according to the disclosed embodiment is now discussed. Such devices must be initialized to accommodate the peer-to-peer automatic synchronization application 36. Upon first power-on of a new device, the new device will inform the user of the user applications that reside on the device. The user may select a user application for which the user desires automatic synchronization with other devices that have the user application. In response to that selection by the user, the peer-to-peer synchronization application 36 in the new device then calls the IOD application 39 by the peer-to-peer synchronization application 36 during the device set-up, or when the user of that device wants to change the list of devices that should be synchronized for a particular application. The IOD application 39, as previously mentioned, identifies the other devices that should be synchronized for a particular application and populates the device identifiers for those other devices in the table that list the devices to be synchronized for a given application. The IOD application 39 then tells the user to power-on the other devices that have the selected application with which the user desires to automatically synchronize. The IOD application 39 then establishes communication through the data communication bearer 40 with powered-on devices within the proximity of the new device. That communication can occur using techniques such as WiFi, over infrared, over RF in unlicensed frequency bands, or over a wired or wireless local area network. The IOD application 39 sends a request to each other device to send their unique device identifier (those other devices must have an IOD application as well). The other devices then return their identities to the IOD application 39 on the new device in response to the query.

The IOD application 39 then updates the other-device table 38 within the new device to list the equipment identifiers of the other devices with which the particular user application database should automatically synchronize. The IOD application then informs the other devices to update their other-device tables 38 with the same information just added to the new device.

The IOD application of the new device then asks the user to enter the device identifiers of additional devices that should be automatically synchronized across a wide area network or the Internet. The IOD application 39 also obtains the addresses of those devices for establishing communication and automatic synchronization across the wide area network or the Internet. Upon successfully entering the equipment identifiers of the other devices and verifying their addresses, the IOD application 39 adds those devices to the other-device table 38. The IOD application 39 then informs the peer-to-peer synchronization application 36 of the new device that it has completed initialization for the new device.

As previously mentioned, the synchronization application 36 includes a user-input function that allows the user to add or delete devices from the other-device table through the user applications resident on the new device. Upon selection of this add/delete function, the synchronization application 36 repeats the foregoing steps of communicating with the added or deleted devices, and updating the other-device tables 38 in those other devices and in the present device.

The user can select other user applications resident in the new device for which the user desires automatic synchronization with other devices that have the particular user application. In this case, the synchronization application repeats the applicable foregoing steps for that additional user application.

Figure 3:
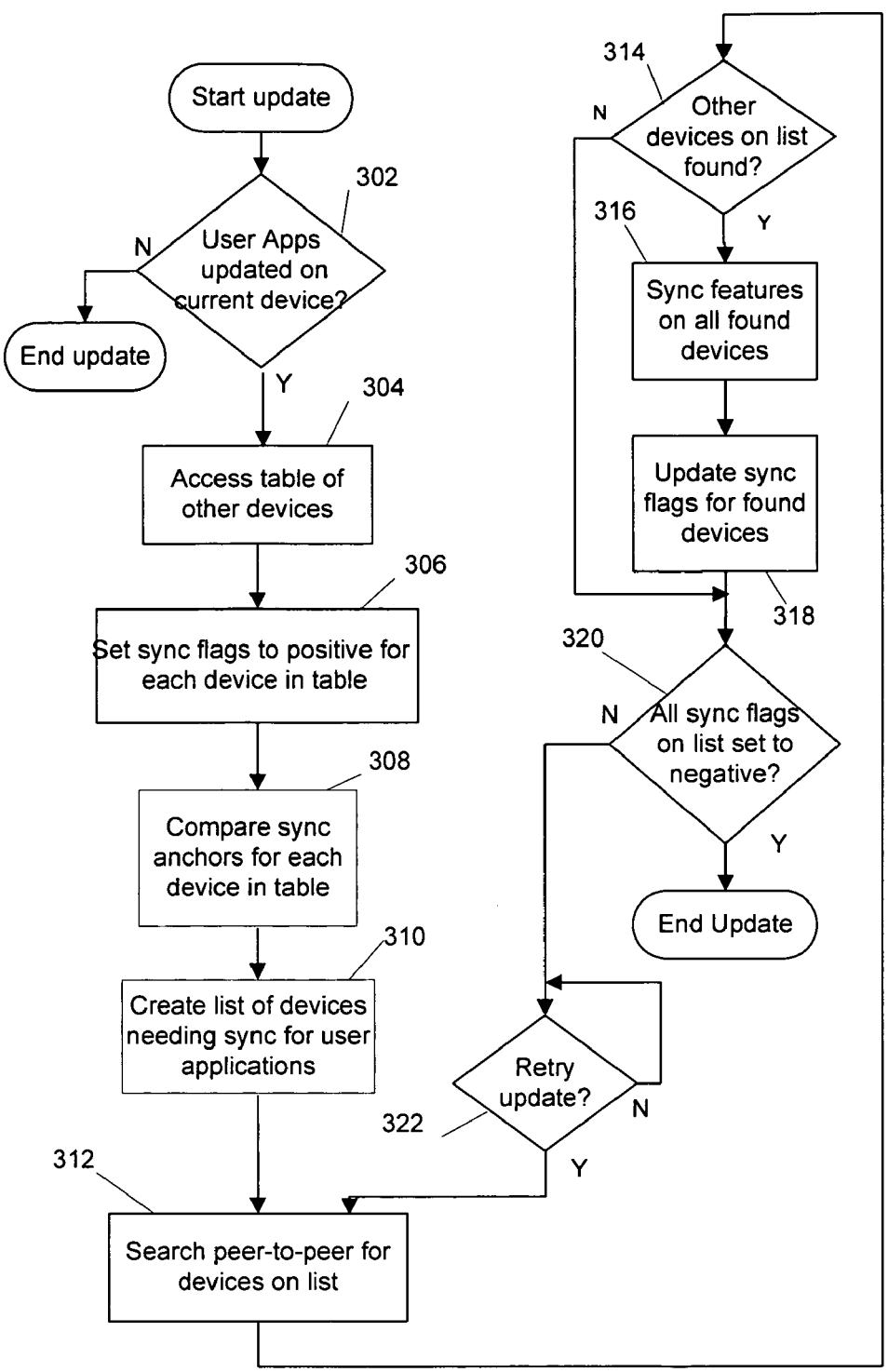
FIG. 3 is a schematic view showing peer-to-peer synchronization of features according to another modification of the embodiment shown in FIG. 1.

FIG. 3 illustrates a method for automatic synchronization of data for a user application across multiple devices according to the disclosed embodiment. The method assumes a user device having at least one user application and previously initialized or otherwise enabled to add at least one other device to the table 38 of other devices for peer-to-peer synchronization, as described above. The automatic update routine commences at 302 in FIG. 3, where the user applications on the current device are periodically queried for a possible update. If a user application has been updated, the time of the update for that application is time stamped and the process at 304 accesses the table of other devices 38 with which the current device must synchronize the user application. A synchronization flag is set to positive for each other device located in the table at 306. The process compares the "last" synchronization time stamp for each device with the "next" synchronization time of the current device, at 308. For each other device where the "last" and "next" synchronization anchors do not agree, at 310 the application creates a list of devices that need to be synchronized for the particular user application.

The present device then initiates a peer-to-peer search at 312 for each device on the list of other devices that need to be synchronized for the user application. The data communication bearer 40, FIG. 2, should first use the bearer data channel of the peer-to-peer network. As previously mentioned, that data bearer channel for the peer-to-peer network can be wired or wireless. The wireless bearer data channel could be WiFi, Bluetooth, or other wireless protocols. The wired bearer data channels may be such as HPNA (Home Plug Network Adapter), power line carrier, Ethernet, or other wired connection protocols.

The process then at 314 queries whether devices on the list of devices that need synchronizing for the user application have been found. If yes, the synchronization engine 34 of the current device uses the SyncML protocol or a similar automatic synchronization protocol to synchronize the user application with the found other devices. Following that synchronization at 316, the synchronization engine 34 updates the synchronization flag status at 318 for each found device on the list. This update must take place on all devices that have received the automatic synchronization update.

If all synchronization flags for the listed device are set to negative at 320, the update process ends. However, if synchronization of one or more devices on the list failed, for example, because communication could not be established with those other devices, then at 322 the present device will periodically retry the update sequence with respect to those other devices. The device manufacturer can set a periodic time interval as a default for retrying updates, and the system preferably allows the user to change that time interval.

Returning to the query of other devices at 314, if no devices on the list 310 of other devices needing synchronization are found, the process checks synchronization flags at 320 and then goes to 322 for trying periodic updates of those devices not found.

It should be noted that all other devices that have received the automatic synchronization update will periodically attempt to engage communication with the devices on the list of devices that need to be synchronized for the particular user application. When peer-to-peer communication is established with the devices on the list, synchronization of the user application takes place as at 316 and 318. In this way, automatic synchronization is accomplished through indirect communication between the particular device on which a change was made, to another device on the list of devices needing synchronization for that user application.

Referring next to FIG. 4, it is seen that a personal computer 44 is included among the devices for peer-to-peer synchronization according to a modified embodiment of the present invention. However, the computer 44 is functioning as another peer device equipped according to the present invention for synchronizing peer-to-peer with the other devices 14, 16, 18, and 20. For example, the computer 44 may have on-board user applications such as a personal information manager or an address book application. The computer 44 also is equipped with features as shown in FIG. 2, including the synchronization engine 34 using SyncML and other elements disclosed herein for peer-to-peer communication within the selected devices. The computer 44 in FIG. 3 thus is not operating in a client-server relation to the other devices 14, 16, 18, and 20, unlike prior-art applications. With the embodiment as shown in FIG. 4, a user may thus update an address book onto the user's cellular handset (e.g., while away from the user's office) and updated information will automatically synchronize with the computer 44 (as well as with the other enabled devices) whenever data communication is established between the cellular handset and at least one other device directly or indirectly linked as a peer to the computer 44.

Figure 2A:
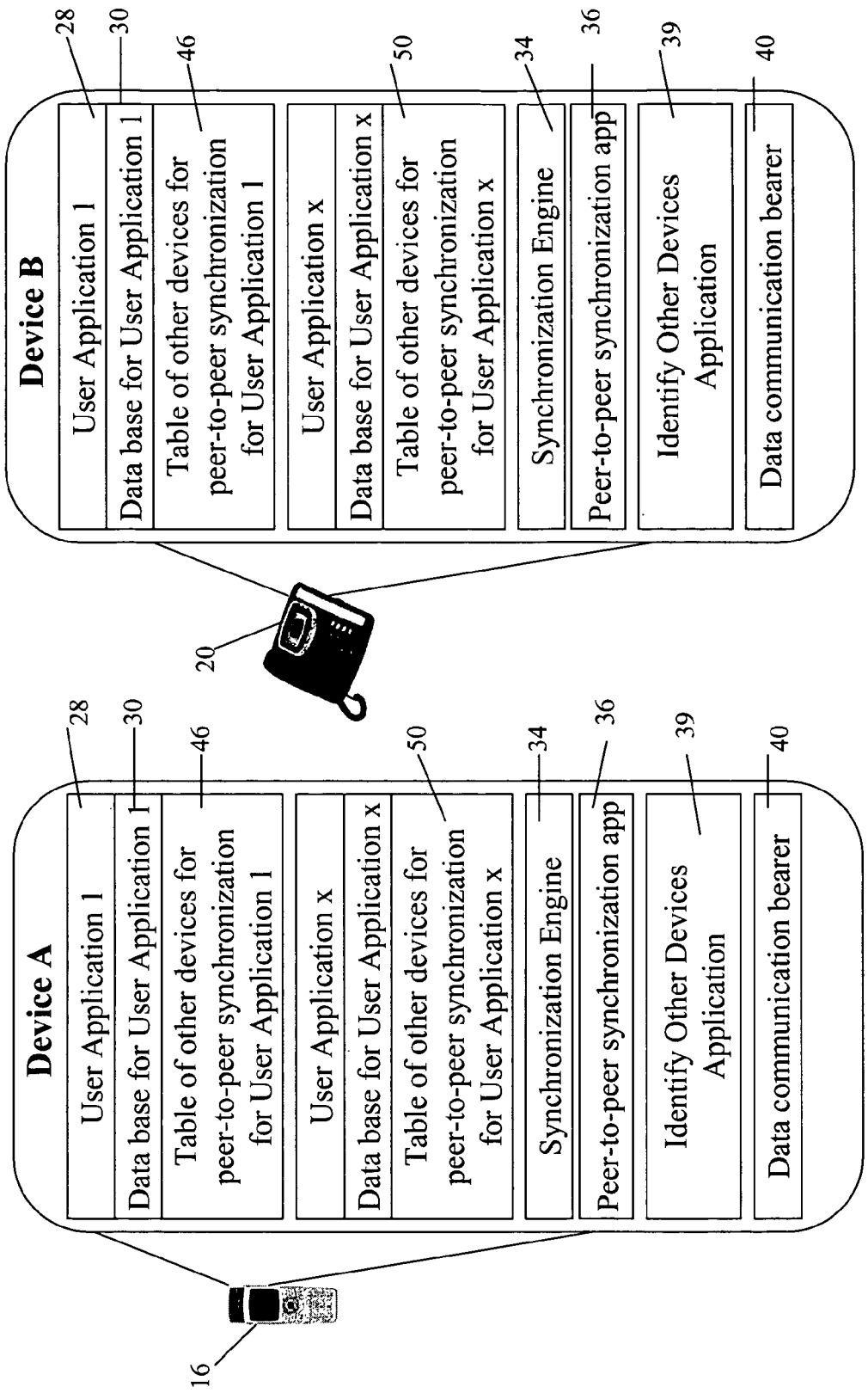
FIG. 2A is a schematic view illustrating elements of two devices equipped for peer-to-peer synchronization of features according to a modification of the embodiment shown in FIG. 1.

With the embodiment shown in FIG. 2, the tables 38 of other devices are shared by all the user applications resident in the respective exemplary devices A and B. However, the alternative embodiment illustrated in FIG. 2A shows a separate table of other devices resident within each user application in the respective exemplary devices. Thus, for each exemplary device A and B of the embodiment shown in FIG. 2A a first user application 28 has a table 46 of other devices selected by the user for peer-to-peer synchronization with that first user application in other devices. The other user applications, collectively indicated at 48, each have corresponding tables (collectively indicated at 50) for other devices selected by the user for peer-to-peer synchronization with the corresponding user applications of the respective other devices.

It should also be understood that the foregoing relates only to preferred embodiments of the present invention, and that changes and modifications thereto may be made without departing from the spirit and scope of the invention as defined in the following claims.

What is claimed is:

1. A method for synchronizing data contained on a plurality of devices, comprising:
   providing a particular one of the plurality of devices with a list identifying other devices of the plurality of devices with which the data is to be synchronized, wherein the data is associated with a particular user application on the particular one of the plurality of devices for which the data is to be synchronized, and wherein the other devices are listed in the list as having the particular user application for which the data is to be synchronized, where the plurality of devices comprises a plurality of different device types;
   determining whether the data is changed on the particular one of the plurality of devices;
   accessing the list on the particular one of the plurality of devices to identify the other devices;
   establishing peer-to-peer communication by the particular one of the plurality of devices to the other devices, wherein the peer-to-peer communication comprises a direct communication link between the particular one of the plurality of devices and each of the other devices; and
   transferring the data that has changed to the other devices via said the peer-to-peer communication.

2. The method of claim 1, wherein the transferring of the data that has changed occurs in response to the data changing on the particular one of the plurality of devices.

3. The method of claim 1, further comprising:
   identifying any remaining devices of the other devices for which the peer-to-peer communication was not established; and
   if any of the remaining devices are identified, retrying to establish communication with each of the remaining devices so as to transfer the data that has changed to each of the remaining devices.

4. The method of claim 3, wherein:
   identifying the remaining devices comprises setting a flag for each of the remaining devices, thereby indicating a need to synchronize data with the remaining devices for which the flag was set;

identifying each of the remaining devices to which the data that has changed is transferred in response to the peer-to-peer communication;

canceling the flag previously set for each other device to which the data that has changed is identified as transferred, so that any remaining set flags indicate the remaining devices to which the data that has changed was not transferred; and periodically attempting to establish communication with each of the remaining devices for which the flag remains set.

5. The method of claim 1, wherein:

the data is associated with a plurality of user applications resident on the particular one of the plurality of devices.

6. A method for synchronizing data contained on a plurality of devices, comprising:

identifying on one device of the plurality of devices other devices of the plurality of devices with which the data is to be synchronized, wherein the data is associated with a particular user application for which the data is to be synchronized, and wherein each of the other devices is listed in a list as having the particular user application for which the data is to be synchronized, where the plurality of devices comprises a plurality of different device types;

determining whether the data is changed on the one device of the plurality of devices;

establishing peer-to-peer communication by the one device of the plurality of devices and to the other devices, wherein the peer-to-peer communication comprises a direct communication link between the one device of the plurality of devices and each of the other devices; and transferring the data that has changed to the other devices by the peer-to-peer communication.

7. The method of claim 6, wherein the transferring of the data occurs in response to the data changing on the one device.

8. A user device capable of receiving and storing data and sharing that data with other devices that are peers, the user device comprising:

a user database for receiving and storing data useable by the user device;

an identity database for receiving and storing an identity of one other peer device with which the data is to be synchronized, wherein the data is associated with a particular user application on the user device for which the data is to be synchronized, wherein the one other peer device is listed in a list as having the particular user application for which the data is to be synchronized, where the one other peer device is of a device type different from a device type of the user device;

means for establishing peer-to-peer communication by the user device to the one other peer device across a communication network, wherein the peer-to-peer communication comprises a direct communication link between the user device and the one other peer device; and means responsive to a change in the data stored in the user database to transfer the data that has changed via the peer-to-peer communication to the one other peer device stored in the identity database.

9. The user device as in claim 8, wherein the particular user application is operative to enable a user of the user device to access and change the data in the user database.

* * * * *